United States Patent [19]

Cunningham et al.

[11] 4,208,468

[45] Jun. 17, 1980

[54] POLYESTER/VINYL CHLORIDE POLYMER LAMINATES

[75] Inventors: John A. Cunningham, Welwyn Garden City; Grahame M. Reade, Wheathampstead, both of England

[73] Assignee: Imperial Chemical Industries Limited, London, England

[21] Appl. No.: 918,262

[22] Filed: Jun. 22, 1978

[51] Int. Cl.$^2$ .......................... B32B 3/26; B32B 5/18; B32B 27/08; B32B 27/30
[52] U.S. Cl. ................................... 428/315; 428/483; 428/520; 428/910
[58] Field of Search ............... 428/483, 910, 520, 315, 428/482

[56] References Cited

U.S. PATENT DOCUMENTS

| | | | |
|---|---|---|---|
| 3,215,580 | 11/1965 | Benning et al. | 428/514 |
| 3,819,773 | 6/1974 | Pears | 428/483 |
| 3,928,710 | 12/1975 | Arnold et al. | 428/483 |
| 4,066,820 | 1/1978 | Kelly et al. | 428/483 |
| 4,098,952 | 7/1978 | Kelly et al. | 428/483 |
| 4,149,920 | 7/1979 | Ealding et al. | 428/483 |

FOREIGN PATENT DOCUMENTS

| | | |
|---|---|---|
| 835672 | 5/1978 | Belgium . |
| 6815739 | 5/1969 | Netherlands . |
| 6815740 | 5/1969 | Netherlands . |
| 7308861 | 1/1974 | Netherlands . |
| 1085818 | 10/1967 | United Kingdom . |
| 1389872 | 4/1975 | United Kingdom . |
| 1509791 | 5/1978 | United Kingdom . |

*Primary Examiner*—William J. Van Balen
*Attorney, Agent, or Firm*—Cushman, Darby & Cushman

[57] ABSTRACT

A laminate comprising a layer of a synthetic linear polyester, a plasticizer-free primer coating applied to at least one surface of the polyester layer and comprising a cross-linked composition comprising a polymer of at least one monomer selected from the esters of acrylic acid and methacrylic acid, and optionally acrylic and/or methacrylic acid, and at least one layer made from a plasticized vinyl chloride polymer composition which is bonded to the linear polyester layer through the intermediary of the primer coating. The primer coating preferably includes the condensation product of an amine with formaldehye to effect cross-linking.

4 Claims, 4 Drawing Figures

POLYESTER/VINYL CHLORIDE POLYMER LAMINATES

The present invention relates to a laminate and to a method for its production.

It has been found difficult to produce laminates of linear polyesters such as polyethylene terephthalate and vinyl chloride polymers since these two types of polymers do not usually adhere well to each other; indeed polyethylene terephthalate is often used as a release layer for sheets or films of vinyl chloride polymers.

This invention provides a well adhered laminate of a synthetic linear polyester and a plasticised vinyl chloride polymer, the effective bonding between these two particular polymers being promoted by an intermediary primer coating comprising a certain polymeric composition.

According to the present invention there is provided a laminate comprising a layer of a synthetic linear polyester, a plasticiser-free polymeric primer coating applied to at least one surface of the polyester layer and comprising a cross-linked composition comprising a polymer of at least one monomer selected from the esters of acrylic acid and methacrylic acid, and at least one layer made from a plasticised vinyl chloride polymer composition which is bonded to the linear polyester layer through the intermediary of the primer coating.

According to another apsect of the invention there is provided a process for the production of a laminate which comprises applying an aqueous or organic dispersion of a polymeric primer composition to at least one surface of a layer of a synthetic linear polyester, said primer composition comprising a plasticiser-free cross-linkable composition comprising a polymer of at least one monomer selected from the esters of acrylic acid and methacrylic acid, removing the dispersing medium and cross-linking the primer composition, and bonding to one or both sides of the polyester layer, through the intermediary of the primer coating so formed, a layer made from a plasticised vinyl chloride polymer composition.

According to a further aspect of the invention there is provided the use of a plasticiser-free cross-linkable composition, comprising a polymer of at least one monomer selected from the esters of acrylic acid and methacrylic acid, for the production of a primer coating for a layer of a synthetic linear polyester which coating acts, when cross-linked, as an adhesion-promoting agent between the layer of polyester and a layer made of a plasticised vinyl chloride polymer which is bonded thereto.

It is to be understood that the term "layer" embraces foils, films and sheets.

The polymer of the primer composition may be a homopolymer or a copolymer. The polymer may optionally include a copolymerised component derived from acrylic acid and/or methacrylic acid. Preferably the primer composition is cross-linked by virtue of the inclusion therein of a condensation product of an amine, such as melamine, urea and diazines or their derivatives, with formaldehyde, which may be alkylated.

The above defined primer coating promotes excellent adhesion between the linear polyester layer and the plasticised vinyl chloride polymer layer. An example of a composition used for the primer coating comprises a copolymer of ethyl acrylate, methyl methylacrylate and methacrylamide, which has been cross-linked with an ethylated melamine/formaldehyde condensation product. The primer composition is preferably cross-linked with the aid of a suitable added cross-linking catalyst, e.g. ammonium chloride, ammonium nitrate, ammonium thiocyanate, ammonium dihydrogen phosphate, ammonium sulphate, diammonium hydrogen phosphate, para toluene sulphonic acid, maleic acid stabilised by reaction with a base, or morpholinium para toluene sulphonate. The cross-linking is preferably effected before the laminating operation begins. The primer coating may be applied to the linear polyester layer from an aqueous or organic medium but preferably is applied as an aqueous dispersion. The polyester layer bearing the dispersion should be dried, preferably by heating to a temperature exceeding 70° C. and up to a maximum temperature determined by the nature of the polyester employed. Heating not only serves to drive off the aqueous or organic medium but also to facilitate the cross-linking reactions.

The primed polyester layer (before lamination) is not at all sticky and can be stored (e.g. wound up in a roll) like an unprimed polyester film without any problems.

Examples of suitable synthetic linear polyesters which may be used for the laminates of the invention include those polyesters which may be obtained by condensing one or more dicarboxylic acids or their lower alkyl diesters, e.g. terephthalic acid, isophthalic acid, phthalic acid, 2,5-, 2,6- and 2,7-naphthalene dicarboxylic acids, succinic acid, sebacic acid, adipic acid, azelaic acid, diphenyl dicarboxylic acid, and hexahydroterephthalic acid or bis-p-carboxylphenoxy ethane, and optionally a monocarboxylic acid, such as pivalic acid, with one or more glycols, e.g. ethylene glycol, 1,3-propanediol, 1,4-butanediol, neopentyl glycol and 1,4-cyclohexanedimethanol. Biaxially oriented and heat-set films or sheets of polyethylene terephthalate are particularly preferred for the production of laminates according to the invention.

When the layer of the linear synthetic polyester is an oriented film, e.g. a biaxially oriented film of polyethylene terephthalate, the primer coating composition may be applied to the polyester layer before or between the stretching operations employed to achieve orientation. A convenient procedure is to coat the polyester film between the two stretching operations which are applied in mutually perpendicular directions to orient the film. The heat treatment of the film during the stretching operation(s) and heat setting serves also to remove the dispersing medium and to effect cross-linking.

Any suitable vinyl chloride polymer may be employed in the laminates of the invention. By a vinyl chloride polymer, is meant a vinyl chloride homopolymer or a vinyl chloride copolymer containing at least 50% molar (preferably at least 80% molar) of polymerised vinyl chloride. The vinyl chloride polymer may be prepared by any suitable polymerisation process, e.g. polymerisation in aqueous emulsion, suspension or microsuspension, or in bulk, provided the properties (particularly the morphology) of the resulting polymer are such that the polymer is siuitable for use in the particular lamination procedure envisaged.

The presence of the plasticiser in the vinyl chloride polymer layer is an essential requirement for the achievement of a strong bond. The optimum amount or range of plasticiser to be used for any particular laminate should be determined experimentally as this depends, inter alia, on the minimum acceptable level of adhesion required, on the type of plasticiser employed, on the nature of the linear polyester employed, on the nature of the vinyl chloride polymer employed and on the method of bonding used to form the laminate. However an amount of plasticiser within the range 20% to 120% by weight based on the weight of the vinyl chloride polymer is usually acceptable for most laminates. Suitable plasticisers for use in the laminates of the invention include phthalate esters such as dioctyl phthalate, di-iso-octyl phthalate, C7–C9 alkyl phthalate and butyl benzyl phthalate, phosphates such as tricresyl phosphate, carboxylic acid esters such as di-iso-octyl adipate, di-2-ethylhexyl azelate and dioctyl sebacate, compounds derived from soya bean oil such as epoxidised soya bean oil, liquid polyester plasticisers such as polypropylene laurate and chlorinated substances such as the chlorinated paraffins. The preferred plasticisers are the alkyl phthalates, particularly dioctyl phthalate, di-iso-octyl phthalate, C7–C9 alkyl phthalate and butyl benzyl phthalate.

The layer of plasticised vinyl chloride polymer may be incorporated into the laminate of the invention by any suitable technique.

In one method a plastisol or an organosol derived from a vinyl chloride polymer (the polymer normally being made by polymerisation in aqueous emulsion or microsuspension) is spread onto a primed layer of a linear polyester and the assembly is heated to gel the plastisol or (after removal of the diluent) the organosol into a coherent layer. The heating may also cause the vinyl chloride polymer layer to become acceptably bonded to the linear polyester layer. If the adhesion is insufficient, further heating and/or pressure may be applied to effect a strong bond. Alternatively the plastisol may be embossed. The plastisol in some cases may advantageously be foamable, so that the plastisol fusing step also causes a foamed vinyl chloride polymer layer to be formed.

In another method, a pre-formed plasticised film containing a plasticised vinyl chloride polymer (the polymer normally being made by polymerisation in aqueous suspension, microsuspension or emulsion) and a primed film of a linear polyester (usually polyethylene terephthalate) are fed through hot rollers (provided e.g. by a calender) in order to bond the polyester film to the plasticised vinyl chloride polymer film.

The laminates of the invention find uses in many applications. For example they may form the basis of laminated cushioned flooring, the cushioned flooring comprising e.g. a support polyethylene terephthalate film laminated on its lower side, through the intermediary of a primer coating (as defined), to a filled unfoamed plasticised vinyl chloride polymer layer forming the base of the flooring (the filler e.g. being a heat stabilised TiO$_2$ composition), and on its upper side, again through the intermediary of a primer coating (as defined) to a foamed layer of a plasticised vinyl chloride polymer which has been applied by spreading a plastisol as described above, the upper surface of the foam being suitably patterned (e.g. by printing) and normally protected by a clear wear-resistant layer.

The laminates of the invention may also be used as the basis of solid (i.e. entirely unfoamed) floor or wall tiles which comprise e.g. a filled plasticised vinyl chloride base layer suitably patterned on its upper surface (e.g. by printing) and laminated, through the intermediary of a primer coating (as defined), to a clear wear-resistant layer of polyethylene terephthalate, the lamination being effected by calendering the vinyl chloride layer (pre-formed) and the primed polyethylene terephthalate layer.

Another use for laminates of the invention is as protective, tamper-proof coverings for identification cards such as security cards, bank cards, credit cards, identity cards and the like. These can be prepared by covering the card on each surface with facing polyester/vinyl chloride polymer laminates according to the invention the layers being in the form of flexible or stiff films) each laminate extending beyond the card perimeter and the linear polyester layers of the laminates being outermost and the plasticised vinyl chloride polymer layers being innermost; the assembly can then be heat-sealed e.g. by passing it through hot rollers, the innermost plasticised vinyl chloride polymer layers enabling each laminate to be bonded to the card and also to the part of the opposite laminate which is beyond the perimeter of the card.

Another possible application for laminates according to the invention is their use as cladding for various substrates, e.g. GRP sheet, where the linear polyester layer improves the ageing performance of the substrate while the vinyl chloride polymer layer (situated outermost) decreases the susceptibility of the polyester to degradation by ultra-violet light.

Another use for laminates according to the invention is as adhesive tapes in packaging and electrical applications where the laminated tapes replace those made solely from vinyl chloride polymers which are known to suffer from poor transverse tensile strength. The polyester layer (when biaxially oriented) significantly improves the transverse tensile strength of the tape while the plasticised vinyl chloride layer enables a very thin polyester layer (e.g. ~10–15$\mu$) to be employed without detracting from the tape's improved tensile properties; a thick polyester tape would be economically less attractive. The plasticised vinyl chloride polymer layer should also be very thin (e.g. ~12–18$\mu$) in order for the total tape thickness to be acceptably thin, and so the lamination is preferably effected by the application of an organosol of the vinyl chloride polymer to the primed polyester film and (after removing the volatile diluent) gelling the organosol.

The present invention is further illustrated by the following description with reference to the accompanying drawings in which.

It is to be understood that for the purpose of clear illustration, the drawings are schematic, are not to scale, and have exaggerated features.

Figure 1:
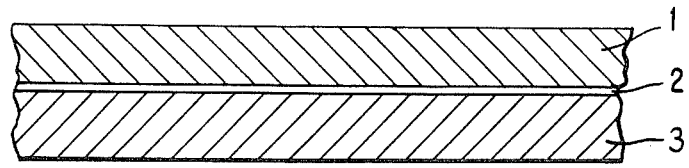
FIG. 1 is part of a cross-section of a laminate according to the invention.

The laminate of FIG. 1 has a plasticised film 1 of a vinyl chloride polymer bonded, through the intermediary of a primer coating 2 according to the invention, to a biaxially oriented film 3 of polyethylene terephthalate.

Figure 2:
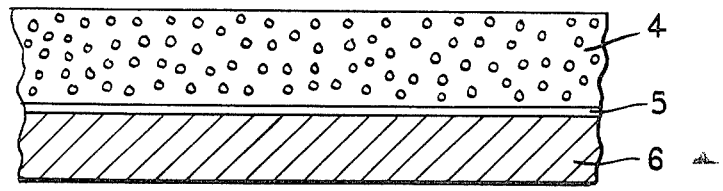
FIG. 2 is part of a cross-section of another laminate according to the invention.

The laminate of FIG. 2 consists of a foamed plasticised layer 4 of a vinyl chloride polymer bonded, through the intermediary of a primer coating 5 according to the invention, to a biaxially oriented film 6 of polyethylene terephthalate.

Figure 3:
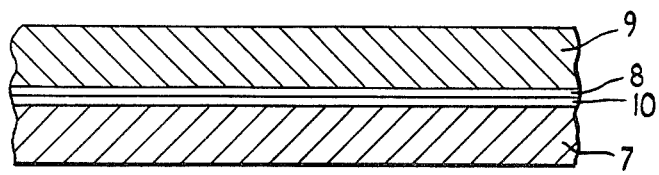
FIG 3 is part of a cross-section of a laminate according to the invention in the form of a solid floor or wall tile.

The solid floor or wall tile of FIG. 3 consists of a base sheet 7 of a filled plasticised vinyl chloride polymer bonded through the intermediary of a primer coating 8 according to the invention to a wear-resistant biaxially oriented film 9 of polyethylene terephthalate. The sheet 7 has a printed pattern, denoted by 10, on its upper side.

Figure 4:
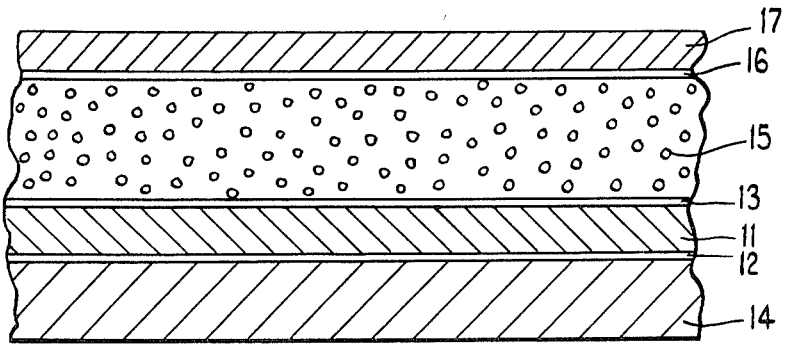
FIG. 4 is part of a cross-section of a laminate according to the invention in the form of a piece of cushion flooring.

The cushioned flooring of FIG. 4 consists of a biaxially oriented film 11 of polyethylene terephthalate primed on each side with primer coatings 12 and 13 and bonded through the intermediary of the primer coatings 10 respectively to a base sheet 14 made from a filled plasticised vinyl chloride polymer and to a foamed layer 15 made from a plasticised vinyl chloride polymer. The foamed layer 15 has a printed pattern, denoted by 16, on its upper side which is protected by a wear-resistant layer 17.

The present invention is further illustrated by the following Examples. Unless otherwise specified, all parts and percentages are by weight.

EXAMPLE 1

A biaxially oriented film of polyethylene terephthalate was prepared by stretching in mutually perpendicular directions at 90°–95° C. followed by heat-setting at about 210° C.; after the first stretching operation the film was coated on one side with a primer composition derived from an aqueous latex of 9.6 parts of a cross-linkable acrylic composition consisting of 87% of a copolymer of ethyl acrylate, methyl methacrylate and methacrylamide (45%, 50% and 5%) and 13% of ethylated melamine formaldehyde, 0.3 parts of poly(ethylene oxidepropylene oxide) emulsifier, 0.1 parts ammonium chloride (catalyst) in 90 parts water, the heating during the second stretching operation and heat setting serving to remove the water and cross-link the acrylic composition. The film was coated on the primed side with a plastisol composition having the following formulation:
Vinyl chloride homopolymer (K65) (prepared by microsuspension polymerisation): 100 parts
Di-iso-octyl phthalate: 80 parts
Ground limestone (filler): 100 parts
Ba/Cd based liquid (stabiliser) 2 parts The plastisol was produced by mixing the constituents in a planetary mixer and was spread as a 3 mm thick layer on the coated polyethylene terephthalate film using knife-over-roll coating. The coated assembly was passed through a circulating air oven at 190° C. for 3 minutes to fuse the plastisol and to generate a bond between the vinyl chloride homopolymer and the polyethylene terephthalate film. The laminate was cooled and reeled.

The bond between the vinyl chloride homopolymer film and the polyethylene terephthalate film was found to be very strong. The type of laminate formed is illustrated in FIG. 1.

EXAMPLE 2

The procedure used was substantially that of Example 1. However the vinyl chloride homopolymer plastisol employed was foamable and had the following formulation:
Vinyl chloride homopolymer (K65) (prepared by microsuspension polymerisation): 100 parts
Butyl benzyl phthalate: 30 parts
C7–C9 alkyl phthalate: 20 parts
Chlorinated paraffin wax: 12 parts
Azodicarbonamide (blowing agent): 2 parts
Dibasic lead phosphate (stabiliser): 3 parts
TiO$_2$ (pigment): 5 parts The assembly (having an unfoamed plastisol layer 1 mm thick) was heated at 195° C. for 3.5 minutes, producing a foamed vinyl chloride polymer layer 3.5 mm thick bonded strongly to the polyethylene terephthalate film. The type of laminate formed is illustrated in FIG. 2.

EXAMPLE 3

The coated polyethylene terephthalate film as used in Examples 1 and 2 was used for this Example. A calendered vinyl chloride copolymer sheet having the following formulation was prepared:
Vinyl chloride/vinyl acetate (85/15) copolymer (prepared by suspension polymerisation): 100 parts
Dioctyl phthalate: 35 parts
Calcium carbonate (filler): 360 parts
Asbestos powder (filler): 90 parts
Heat stabiliser: 3 parts This calendered sheet was press laminated (160° C., 4 minutes pressing) to the primed polyethylene terephthalate film. The bond formed was very strong.

The type of laminate formed is illustrated in FIG. 1 (with the vinyl chloride layer being made from a calendered sheet and not from a plastisol as in Example 1).

EXAMPLE 4

Cushion flooring of the type illustrated in FIG. 4 was prepared, starting from biaxially oriented polyethylene terephthalate film coated on both sides with the primer composition used in Examples 1 to 3.

Firstly, a layer of filled unfoamed vinyl chloride polymer (e.g. made from the formulation used in Example 1 or Example 3) was bonded to the polyester layer using any suitable technique (plastisol spreading, calendering, pressing) so as to form the base of the flooring. Next, a foamable plastisol derived from a vinyl chloride polymer (having the formulation of the plastisol composition used in Example 2) was spread onto the upper side of the primed polyester layer and foamed and gelled by heating. The cushion flooring was suitably patterned by printing and finished with a wear-resistant layer.

We claim:
1. A laminate comprising a layer of a synthetic linear polyester, a plasticiser-free polymeric primer coating applied to at least one surface of the polyester layer and consisting essentially of a cross-linked polymeric composition the polymer of which is a polymer of at least one monomer selected from the esters of acrylic acid and methacrylic acid, and at least one layer made from a plasticised uncrosslinked vinyl chloride polymer composition, the vinyl chloride polymer containing at least 80% molar of polymerised vinyl chloride, which is bonded to the linear polyester layer through the intermediary of the primer coating.

2. A laminate according to claim 1 wherein the polyester layer is biaxially oriented.

3. A laminate according to claim 1 wherein the synthetic linear polyester is polyethylene terephthalate.

4. A laminate according to claim 1 wherein the at least one layer of vinyl chloride polymer is foamed.

* * * * *

UNITED STATES PATENT AND TRADEMARK OFFICE
CERTIFICATE OF CORRECTION

PATENT NO. : 4,208,468
DATED : June 17, 1980
INVENTOR(S) : John A. Cunningham and Grahame M. Reade It is certified that error appears in the above-identified patent and that said Letters Patent are hereby corrected as shown below:

In the heading of the patent, add:

--[30]  Foreign Application Priority Data

July 7, 1977    United Kingdom.....28530/77--

Signed and Sealed this

Fourteenth Day of October 1980

[SEAL]

Attest:

SIDNEY A. DIAMOND

Attesting Officer    Commissioner of Patents and Trademarks